United States Patent
Tamaki et al.

(10) Patent No.: US 6,777,632 B1
(45) Date of Patent: Aug. 17, 2004

(54) MULTIFUNCTIONAL SWITCH STRUCTURE

(75) Inventors: Yasuyuki Tamaki, Hyogo (JP); Satoshi Okamoto, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 172 days.

(21) Appl. No.: 10/130,267

(22) PCT Filed: Oct. 6, 2000

(86) PCT No.: PCT/JP00/06989
§ 371 (c)(1),
(2), (4) Date: May 24, 2002

(87) PCT Pub. No.: WO02/31848
PCT Pub. Date: Apr. 18, 2002

(51) Int. Cl.$^7$ ................................................ H01H 9/00
(52) U.S. Cl. .................................................... 200/302.3
(58) Field of Search ........................... 200/1 R, 4, 5 R, 200/6 R, 6 A, 17 R, 18, 302.1, 302.3, 339

(56) References Cited

U.S. PATENT DOCUMENTS

| | | | | |
|---|---|---|---|---|
| 4,937,407 A | * | 6/1990 | Osika | 200/302.3 |
| 5,045,648 A | * | 9/1991 | Fogleman, Sr. | 200/43.16 |
| 5,053,591 A | * | 10/1991 | Theurer | 200/315 |
| 6,239,392 B1 | * | 5/2001 | Serizawa et al. | 200/5 R |
| 6,444,930 B1 | * | 9/2002 | MacDonald et al. | 200/302.3 |
| 6,573,466 B1 | * | 6/2003 | Rapp et al. | 200/302.3 |
| 6,586,689 B2 | * | 7/2003 | Kuriyama | 200/6 A |

FOREIGN PATENT DOCUMENTS

| | | |
|---|---|---|
| JP | 44274/1975 | 5/1975 |
| JP | 59432/1985 | 4/1985 |
| JP | 194441/1988 | 12/1988 |
| JP | 35200/1995 | 6/1995 |
| JP | 11-149848 | 6/1999 |

* cited by examiner

*Primary Examiner*—Michael A. Friedhofer
(74) *Attorney, Agent, or Firm*—Oblon, Spivak, McClelland, Maier & Neustadt, P.C.

(57) ABSTRACT

A multi-function switch structure includes a multi-function switch provided on a base plate to pivot in a prescribed direction and a rubber film provided on the base plate to cover at least a portion of the outer surface of the multi-function switch. The rubber film is adhered to the multi-function switch. The rubber film is provided with a portion easing tension of the rubber film caused by pivoting movement of the multi-function switch.

9 Claims, 8 Drawing Sheets

MULTIFUNCTIONAL SWITCH STRUCTURE

TECHNICAL FIELD

The present invention relates to a multi-function switch, and in particular to a multi-function switch structure used in a portable phone and a portable phone using the same.

BACKGROUND ART

Recently, portable phones have been widely used. Correspondingly, techniques for improving reliability thereof have been developed. FIG. 10 is a plan view of a conventional portable phone. Referring to FIG. 10, a conventional portable phone 500 includes: a front case 101; a protection window 102 attached to front case 101; a multi-function switch operation key 504 provided in a central portion of front case 101; push buttons 105; a microphone 108 provided below push buttons 105; a flip 106 provided on a lower end side of front case 101; a receiver 107 provided in an upper portion of front case 101; and an antenna 109 provided retractably on an upper end side of portable phone 500.

Antenna 109 is stored in a rear case (not shown). Receiver 107 is provided on the upper side of front case 101.

Below receiver 107, an opening is provided in front case 101, in which protection window 102 is fit. A liquid crystal display 103 is positioned in front case 101 so as to be covered with protection window 102. Multi-function switch operation key 504 is arranged below and in the cinity of liquid crystal display 103. Operation key 504 makes a pivoting movement by a prescribed angle in upward and downward directions in FIG. 10. By a plurality of pivoting movements of operation key 504 and according to the number of the movements, various kinds of data are selected, which will then be displayed on liquid crystal display 103.

Below operation key 504, a plurality of push buttons 105 are provided. Information input by pressing push buttons 105 is displayed on liquid crystal display 103.

Below push buttons 105, microphone 108 is provided.

Flip 106 is pivotably attached to the lower end side of front case 101. As shown in FIG. 10, when flip 106 pivots in a direction away from receiver 107, push buttons 105 are exposed. When flip 106 pivots toward receiver 107 of portable phone 500, flip 106 covers push buttons 105.

FIG. 11 is a plan view of a keypad of the portable phone shown in FIG. 10. Referring to FIG. 11, push buttons 105 are arranged on a prescribed keypad 510. Push buttons 105 are provided to protrude from a base rubber 114. In the upper portion of base rubber 114, other push buttons 112 are provided, spaced apart from each other. Between push buttons 112, a hole 511 is provided for inserting a multi-function switch. Hole 511 is large enough to insert the multi-function switch, and has a shape corresponding to the external shape of the multi-function switch.

FIG. 12 shows a cross-section viewed along the line XII—XII in FIG. 10. Referring to FIG. 12, in a multi-function switch structure of a conventional portable phone, a multi-function switch 550 consisting of a fixed portion 151 and a pivoting portion 552 is provided on a base plate 123. Fixed portion 151 is fixed on base plate 123, and has a slide switch inside. Pivoting portion 552 has a portion fit with fixed portion 151, and pivots in a prescribed direction about the same. In pivoting portion 552, the portion fit with fixed portion 151 has a smaller diameter compared with other portions. Pivoting portion 552 is formed to extend in a direction perpendicular to base plate 123. Operation key 504 is provided so as to be in direct contact with pivoting portion 552. Operation key 504 is formed like a dome having a certain curvature, with its top portion protruded.

Base rubber 114 is provided on base plate 123. In base rubber 114, hole 511 is provided for accommodating multi-function switch 550. Base rubber 114 is pressed toward front case 101 and is fixed to base plate 123.

On multi-function switch 550, operation key 504 with enhanced appearance is fixed. Moreover, this operation key 504 is exposed through the hole of front case 101. In some cases, operation key 504 may have a sliding scheme in addition to pivoting scheme in a prescribed direction.

Recent portable phones have had smaller housings, while having more functions. Therefore, a variety of principal functions have been assigned to a single multi-function switch, and, instead of conventional push buttons 105, operation key 504 has been more frequently used. When a person operates operation key 504, water, for example, perspiration, will adhere thereto. Since operation key 504 pivots or slides in various directions, adhered water may enter the inside of a portable phone from a gap between operation key 504 and front case 101, to reach base plate 123. Consequently, short-circuit of a patterned interconnections on base plate 123 tends to occur, resulting in malfunction when using the portable phone.

In addition, because of pivoting movement of operating key 504, it was difficult to interpose a cushion or the like between operation key 504 and front case 101, and to achieve waterproof and dustproof property as required in daily use.

The present invention was made to solve the above-mentioned problems, and an object thereof is to provide a multi-function switch structure of high reliability, having a dustproof and waterproof structure.

Another object of the present invention is to provide a portable terminal of high reliability, having a dustproof and waterproof structure.

DISCLOSURE OF THE INVENTION

A multi-function switch structure according to the present invention includes a multi-function switch provided on a base plate to pivot in a prescribed direction, and a rubber film provided on the base plate to cover at least a portion of an outer surface of the multi-function switch.

In the multi-function switch structure thus constructed, the rubber film covers at least a portion of the outer surface of the multi-function switch. Accordingly, this rubber film can prevent dust and water from entering the inside of a portable terminal from the multi-function switch. As a result, a multi-function switch structure of high reliability having dustproof and waterproof property can be provided.

Preferably, the rubber film is adhered to the multi-function switch and is provided with a portion easing tension of the rubber film caused by pivoting movement of the multi-function switch. In this case, even if tensile stress is produced in the rubber film having been pulled to move by the multi-function switch, the tensile stress will be eased, and therefore, the rubber film can move smooth. As a result, an excellent operability can be maintained.

A multi-function switch structure according to another aspect of the present invention includes a multi-function switch provided on a base plate to pivot in a prescribed direction, a rubber film provided above the base plate, and an operation key provided on the multi-function switch. The rubber film extends underneath the multi-function switch.

In the multi-function switch structure thus constructed, the rubber film extends underneath the operation key. Therefore, even if dust or water adhered to the outer surface of the operation key comes down the surface of the operation key to enter the inside of a portable phone, the dust and water will be collected on the rubber film and does not reach the base plate. Consequently, a multi-function switch structure of the present invention will have dustproof and waterproof property and improved reliability.

Preferably, the operation key pivots from one end to the other along with the multi-function switch, and even when the operation key has pivoted to reach one end, the rubber film is arranged to extend underneath the operation key. In this case, since the rubber film is positioned to be always underneath the operation key even when the operation key has pivoted, the multi-function switch structure will exhibit waterproof and dustproof property no matter whatever way the operation key may be moved. As a result, a multi-function switch structure will have further improved reliability.

Preferably, any one of the above-described multi-function switch structures is used in a portable terminal.

BEST MODES FOR CARRYING OUT THE INVENTION

In the following, embodiments of the present invention will be described with reference to the figures.

First Embodiment

Figure 1:
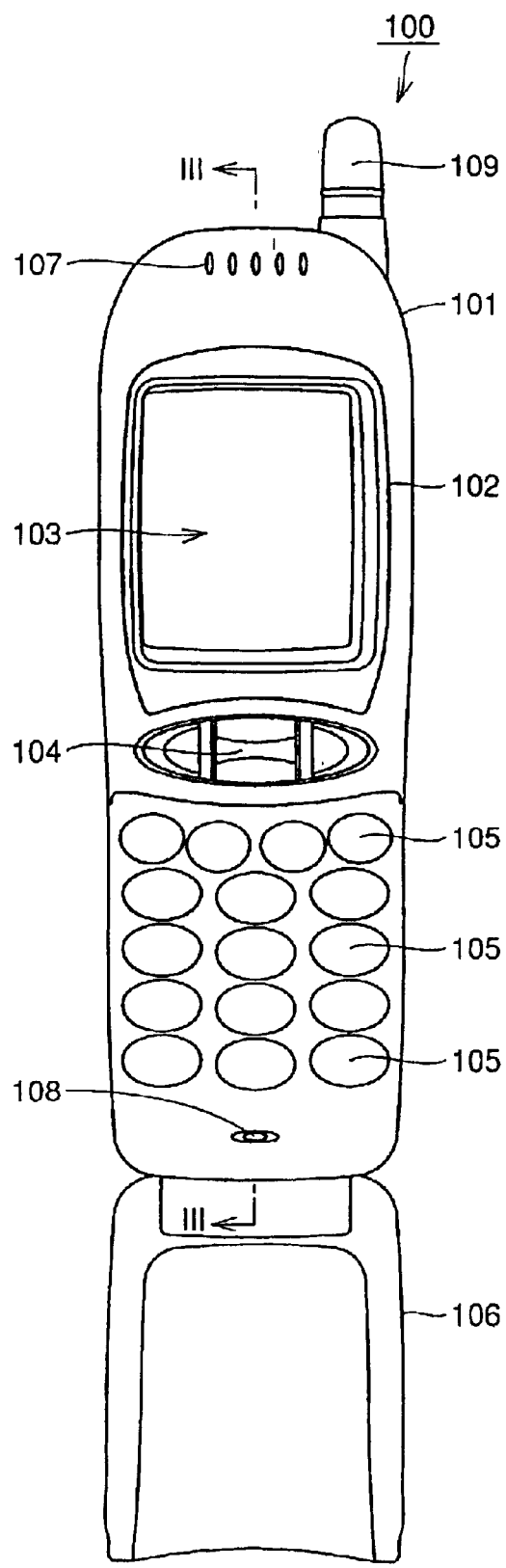
FIG. 1 is a plan view of a portable phone according to a first embodiment of the present invention.

FIG. 1 is a plan view of a portable phone according to a first embodiment of the present invention. Referring to FIG. 1, a conventional portable phone 100 includes: a front case 101 provided as a housing; a protection window 102 attached to front case 101; a multi-function switch operation key 104 provided in a central portion of front case 101; push buttons 105; a microphone 108 provided below push buttons 105; a flip 106 provided on a lower end side of front case 101; a receiver 107 provided on an upper side of front case 101; and an antenna 109 retractably provided on an upper end side of portable phone 100.

Front case 101 extends in one direction and constitutes an outer surface of portable phone 100. Antenna 109 is retractably attached in substantially the same direction as the extension of front case 101. As shown in FIG. 1, when portable phone 100 is not in use, antenna 109 is stored within front case 101. Receiver 107 is provided on the upper side of front case 101. When portable phone 100 is in use, receiver 107 is brought closer to a person's ear and functions to transmit called party's voice to that person.

Below receiver 107, an opening is provided in front case 101, in which protection window 102 is fit. Protection window 102 is composed of a transparent member such as acrylic resin, and transmits light emitted from inside. A liquid crystal display 103 is positioned in front case 101 so as to be covered with protection window 102. Liquid crystal display 103 displays, for example, textual information, and for example, displays thereon a telephone number of a called party or information stored in a memory within portable phone 100. Below liquid crystal display 103, multi-function switch operation key 104 is provided. Operation key 104 makes a pivoting movement by a prescribed angle in up-and-down as well as side-to-side directions in FIG. 1. By a plurality of pivoting movements of operation key 104 and according to the number of the movements, various kinds of data are selected, which will then be displayed on liquid crystal display 103.

Below operation key 104, a plurality of push buttons 105 are provided. Push buttons 105 are regularly arranged on the surface of front case 101. When a person presses each push button 105, prescribed information can be input to portable phone 100. Information input by pressing push buttons 105 is displayed on liquid crystal display 103.

Below push buttons 105, microphone 108 is provided. Microphone 108 functions to convert a voice signal of a user of portable phone 100 to an electric signal for transmission to a called party. Microphone 108 collects a voice signal from the user's mouth when the user's mouth comes closer to microphone 108.

Flip 106 is pivotably attached to the lower end side of front case 101. As shown in FIG. 1, when flip 106 pivots in a direction away from receiver 107, push buttons 105 are exposed. When flip 106 pivots toward receiver 107 of portable phone 100, flip 106 covers push buttons 105. Thus, push buttons 105 can be protected.

Figure 2:
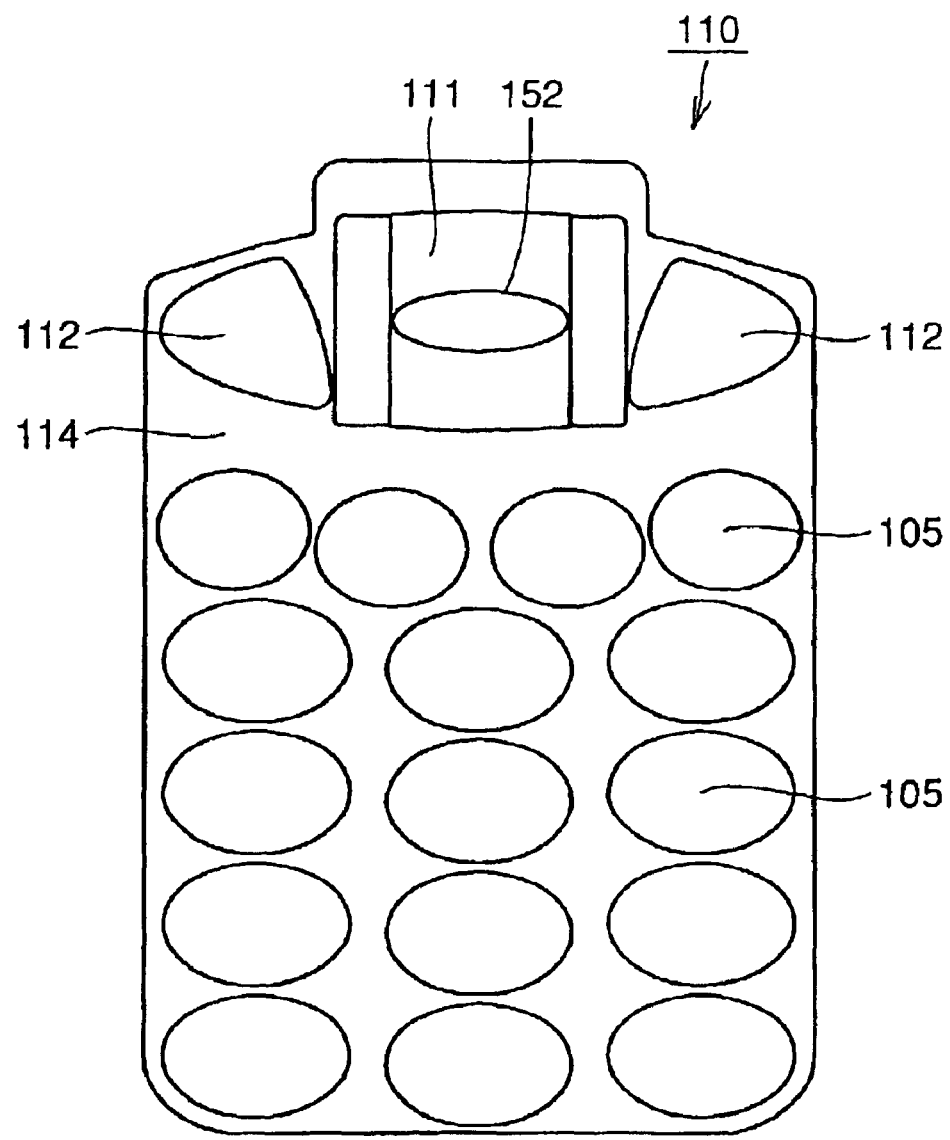
FIG. 2 is a plan view of a keypad of the portable phone shown in FIG. 1.
Figure 3:
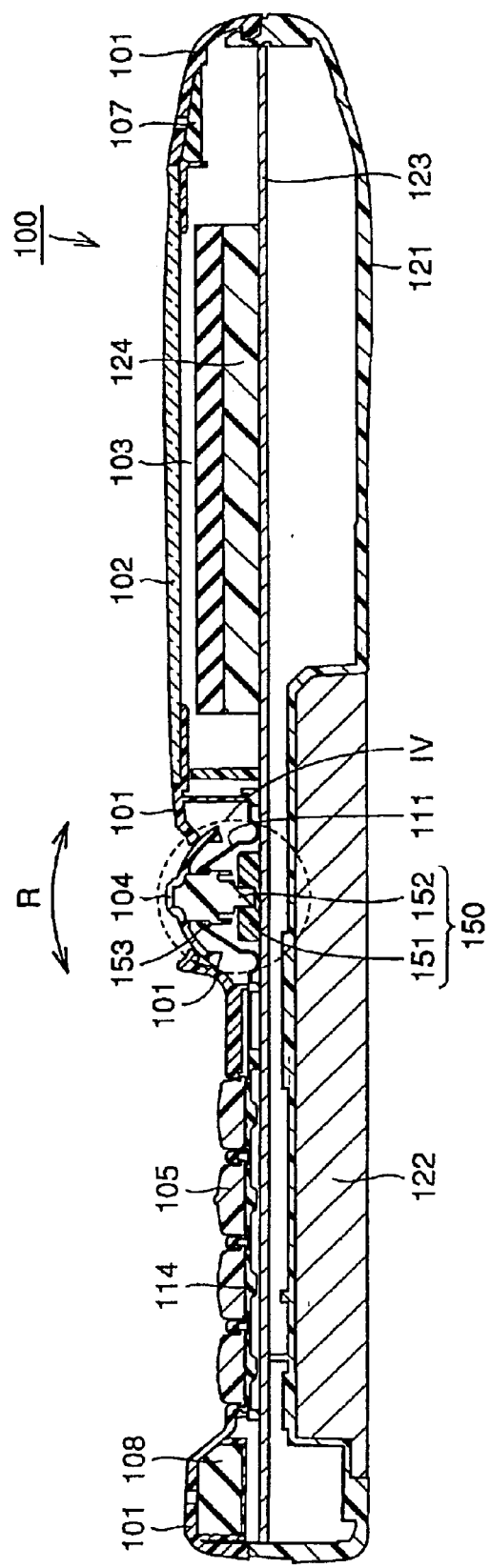
FIG. 3 shows a cross-section viewed along the line III—III in FIG. 1.

FIG. 2 is a plan view of a keypad of the portable phone shown in FIG. 1. FIG. 3 shows a cross-section viewed along the line III—III in FIG. 1. In FIG. 3, flip 106 shown in FIG. 1 is not shown. Referring to FIG. 2, push buttons 105 are provided on a prescribed keypad 110. Push buttons 105 are provided close to each other, protruded from base rubber 114. Other push buttons 112 are provided, with a spacing from each other, in a position distanced from push buttons 105, that is, in an upper portion of base rubber 114.

Between push buttons 112, a rubber film 111 is provided, which is continuous to base rubber 114 and is raised so as to protrude upward. Rubber film 111 is composed of thin rubber, and has a pivoting portion 152 fit to a top portion thereof. Therefore, unlike a conventional keypad 510, a base plate is not exposed between push buttons 112 on keypad 110. Thus, dustproof and waterproof property can be enhanced.

Referring to FIG. 3, portable phone 100 includes: a front case 101 and a rear case 121 provided as a housing; a protection window 102 fit in front case 101; a receiver 107 and a microphone 108 provided in front case 101; a multi-function switch 150 provided in a central portion of front case 101; push buttons 105 provided between multi-function switch 150 and microphone 108; a battery pack 122 fit in rear case 121; and a base plate 123 arranged in a space between front case 101 and rear case 121.

Front case 101 constitutes a front surface of portable phone 100 and is formed to extend in one direction. In front case 101, a prescribed opening is provided, in which protection window 102 is fit. Protection window 102 is constructed with a transparent member. In addition, protection window 102 is slightly curved so as to also act as a lens. Rear case 121 is fit with front case 101. Rear case 121 constitutes a rear face of portable phone 100.

Base plate 123 is supported by rear case 121. Base plate 123 extends in one direction, and various members are placed or adhered thereon. A liquid crystal holder 124 is fixed on base plate 123. On liquid crystal holder 124, liquid crystal display 103 is fixed. Light emitted from liquid crystal display 103 will reach a viewer's eyes through protection window 102. Thus, the viewer can recognize, for example, textual information displayed on liquid crystal display 103.

On base plate 123, multi-function switch 150 is further provided. Multi-function switch 150 is provided on base plate 123 to pivot in a prescribed direction. In addition, rubber film 111 is provided on base plate 123 so as to cover at least a portion of an outer surface of multi-function switch 150.

Multi-function switch 150 is constituted with a fixed portion 151 adhered to base plate 123 and a pivoting portion 152 fit in fixed portion 151 and pivoting to a prescribed direction. Fixed portion 151 has a recess for accommodating pivoting portion 152, and switches on and off by an operation of a slide switch provided in fixed portion 151 in accordance with a movement of pivoting portion 152. Pivoting portion 152 extends in a direction protruding from base plate 123, and has a tip end portion being in direct contact with operation key 104. Moreover, a prescribed spacer 153 is provided on pivoting portion 152, and is adapted to press a push switch mounted on base plate 123 when pivoting portion 152 pivots from front to rear sides of the sheet surface.

A portion of operation key 104 is covered with front case 101, and other portions are exposed therethrough. Operation key 104 pivots about a portion where pivoting portion 152 fits with fixed portion 151, in a direction shown with an arrow R.

Operation key 104 is formed to extend in a pivoting direction and to allow thin rubber film 111 to extend underneath the same. Rubber film 111 is composed of base rubber 114, and adhered to pivoting portion 152 of multi-function switch 150. Rubber film 111 is provided to be highest in a region adhered to pivoting portion 152 and be lower away from pivoting portion 152. Rubber film 111 is adapted to seal most part of fixed portion 151 and pivoting portion 152.

Base rubber 114 is provided to be continuous to rubber film 111. Base rubber 114 is placed on base plate 123, and is sandwiched and fixed between front case 101 and base plate 123. Push buttons 105 are adhered on base rubber 114, and are arranged with a prescribed space from one another respectively.

At one end of front case 101, receiver 107 is provided. Receiver 107 emits voice and sound toward a person's ear through a hole provided in the surface of front case 101.

At the other end of front case 101, microphone 108 is provided. Microphone 108 receives voice of a user through a hole opened in front case 101 and converts the voice to an electric signal.

Battery pack 122 is fit in rear case 121. Battery pack 122 has a power generating element generating prescribed electric power, and electric power supplied by battery pack 122 is distributed, for example, to the liquid crystal display via base plate 123.

Figure 4:
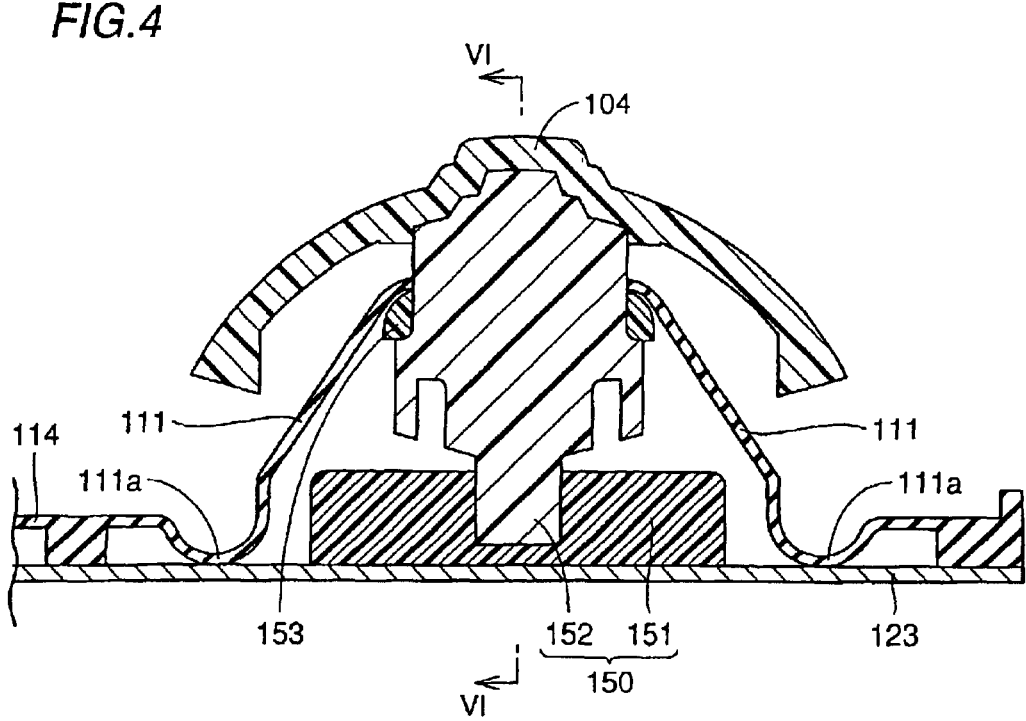
FIG. 4 is a cross-sectional view showing in enlargement a portion encircled with a dotted line IV in FIG. 3.

FIG. 4 is a cross-sectional view showing in enlargement a portion encircled with a dotted line IV in FIG. 3. Referring to FIG. 4, in a multi-function switch structure according to the present invention, multi-function switch 150 is provided on base plate 123. Fixed portion 151 is adhered on the main surface of base plate 123. There is a slide contact point in fixed portion 151, and the slide contact point functions as a switch. In fixed portion 151, a recess is formed, in which pivoting portion 152 is fit. Pivoting portion 152 has a protruding portion fit in the recess. A portion in the vicinity of the protruding portion is gently inclined, and a part of pivoting portion 152 comes into contact with fixed portion 151 when pivoting portion 152 pivots by a prescribed angle. This contact stops pivoting movement of pivoting portion 152.

Pivoting portion 152 is provided to extend in a direction away from base plate 123, and is formed to sandwich rubber film 111. In other words, in rubber film 111, a prescribed through hole is provided, in which pivoting portion 152 is fit. In a region covered with rubber film 111, spacer 153 is provided to be in contact with pivoting portion 152. Spacer 153 is fit in pivoting portion 152. Spacer 153 is also formed to be covered with rubber film 111. Pivoting portion 152 protruding from rubber film 111 directly contacts with operation key 104 having an arcuate outer surface. As operation key 104 is fixed to pivoting portion 152, when operation key 104 pivots in a prescribed direction, pivoting portion 152 will also pivot in the same direction. Thus, by moving operation key 104, pivoting portion 152 also pivots in the same direction as operation key 104.

In rubber film 111, a portion 111a easing tension of rubber film 111 caused by pivoting movement of pivoting portion 152 is provided. Though portion 111a is in a position below an end portion of operation key 104 in rubber film 111, the position thereof is not limited as described above. In order to achieve an object of easing tensile stress in rubber film 111, portion 111a should have smaller strength than other portions and be able to ease tensile stress; for example, portion 111a can be of a shape of "bellows". In addition, it is also possible to insert a film of small strength only in portion 111a. In this example, though base plate 123 and portion 111a are in contact, the former may be spaced away from the latter.

Figure 5:
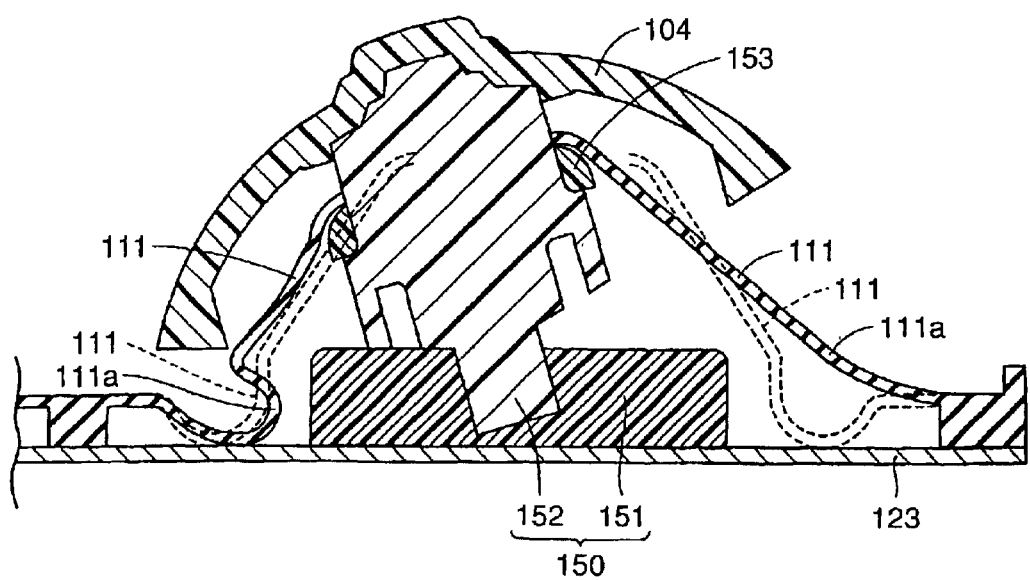
FIG. 5 is a cross-sectional view illustrating an operation of a multi-function switch structure shown in FIG. 4.

FIG. 5 is a cross-sectional view illustrating an operation of the multi-function switch structure shown in FIG. 4. Referring to FIG. 5, when operation key 104 pivots to the left in FIG. 5, pivoting portion 152 fit with fixed portion 151 also pivots to the left. Here, rubber film 111 positioned on the right side in FIG. 5 is initially present in a position shown with a dotted line, and moves to a position shown with a solid line as operation key 104 makes pivoting movement. Here, though tensile stress is produced in rubber film 111, tensile stress produced therein can be eased because portion 111a has play as a precaution and extends to the full extent. On the other hand, on the left side in FIG. 5, rubber film 111 is provided with further play and is significantly bent in portion 111a. Pivoting movement is stopped when an inclined surface of pivoting portion 152 comes in contact with fixed portion 151. In FIG. 5, even when operation key 104 is in a pivoted position, rubber film 111 is arranged to extend underneath operation key 104.

Figure 6:
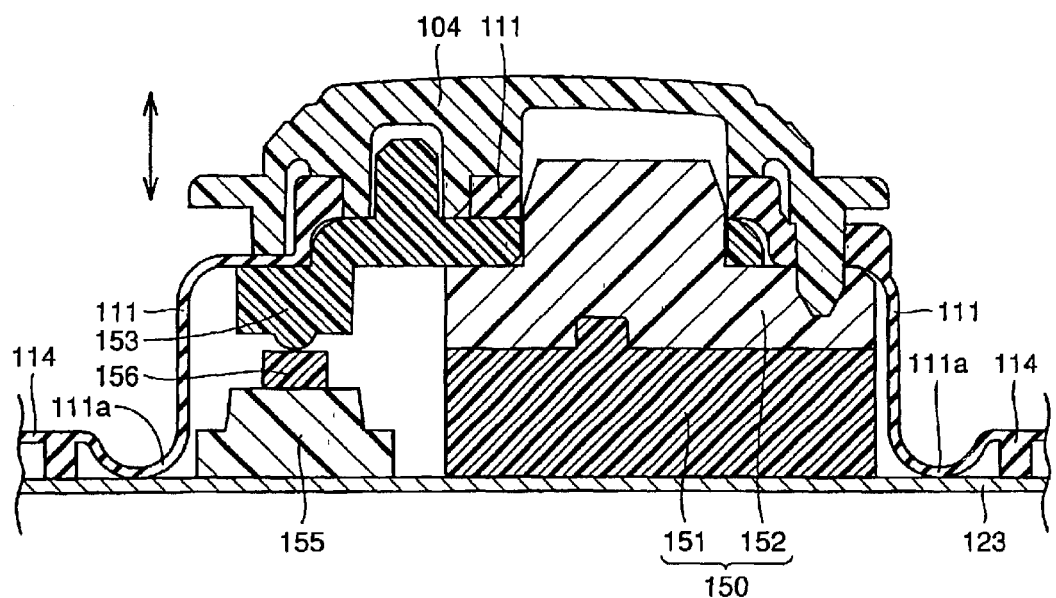
FIG. 6 shows a cross-section viewed along the line VI—VI in FIG. 4.

FIG. 6 shows a cross-section viewed along the line VI—VI in FIG. 4. Referring to FIG. 6, fixed portion 151 of multi-function switch 150 is provided on base plate 123. Fixed portion 151 is adhered to base plate 123. Pivoting portion 152 is placed on fixed portion 151. Pivoting portion 152 is pivotable on fixed portion 151 from front to rear sides of the sheet surface. Spacer 153 is fit in pivoting portion 152. Spacer 153 extends from right to left sides of the sheet surface, and an end portion thereof is in contact with a switch 156. Here, switch 156 is fit in a body 155 provided on base plate 123. By pressing operation key 104 to the left side of the sheet surface, spacer 153 pivots downward, thus pressing switch 156. When switch 156 is pressed, switch 156 is depressed into body 155, thus switching on and off.

Rubber film 111 is provided so as to cover fixed portion 151, a part of pivoting portion 152 and spacer 153. Rubber film 111 extends as it rises from base plate 123, and extends along spacer 153. In addition, in rubber film 111, a through hole is formed, in which a protruding portion of spacer 153 or of pivoting portion 152 is fit. Rubber film 111 is thus fixed to spacer 153 and pivoting portion 152. In a boundary portion of rubber film 111 and base rubber 114, portion 111a easing tensile stress is provided. Once coming closer to base plate 123, portion 111a extends away therefrom, and play of rubber film 111 is provided in this portion. In other words, in portion 111a, rubber film 111 is made slack and length thereof is made larger.

Operation key 104 is provided on rubber film 111. Operation key 104 fits with a hole opened in the rubber film, and comes in direct contact with spacer 153 and pivoting portion 152. Therefore, rubber film 111 is sandwiched by spacer 153 and pivoting portion 152 and operation key 104.

In a multi-function switch structure thus constructed and in a portable phone using the same, rubber film 111 is provided to cover multi-function switch 150. As a result, water and dust can be prevented from entering multi-function switch 150, to enhance waterproof and dustproof property. Consequently, a multi-function switch and a portable phone of high reliability can be provided.

Second Embodiment

Figure 7:
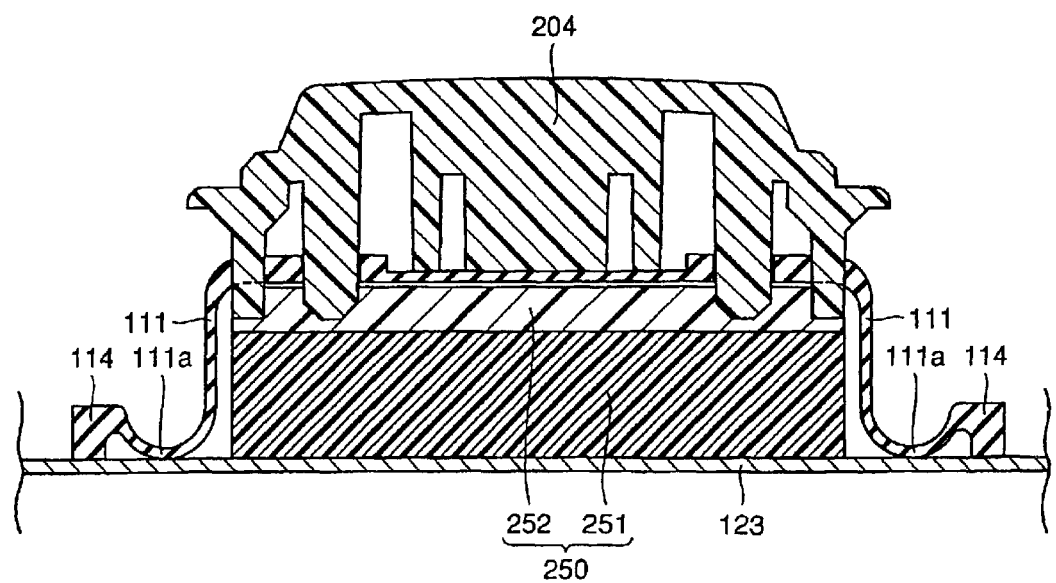
FIG. 7 is a cross-sectional view of a multi-function switch according to a second embodiment of the present invention.

FIG. 7 is a cross-sectional view of a multi-function switch structure according to a second embodiment of the present invention. FIG. 7 corresponds to the cross-section shown in FIG. 6. Referring to FIG. 7, in a multi-function switch structure according to the second embodiment of the present invention, a multi-function switch 250 consisting of a fixed portion 251 and a pivoting portion 252 is provided on base plate 123. Fixed portion 251 attains the same function as fixed portion 151 shown in the first embodiment. Pivoting portion 252 is fit in fixed portion 251. Rubber film 111 is provided to be in contact with pivoting portion 252. Rubber film 111 covers fixed portion 251 and pivoting portion 252 constituting multi-function switch 250. Rubber film 111, similarly as rubber film 111 shown in FIG. 6, is continuous to base rubber 114, and has a portion 111a providing play with respect to base rubber 114. A plurality of through holes are provided in rubber film 111, and a rib of an operation key 204 is provided to fit with those through holes. Accordingly, a spacer as shown in the first embodiment is not provided between operation key 204 and pivoting portion 252. When the rib of operation key 204 penetrates rubber film 111 and is fit in pivoting portion 252, rubber film 111 is fixed between pivoting portion 252 and operation key 204.

A multi-function switch structure thus constructed and a portable phone using the same also have the same effect as in the first embodiment.

Third Embodiment

Figure 8:
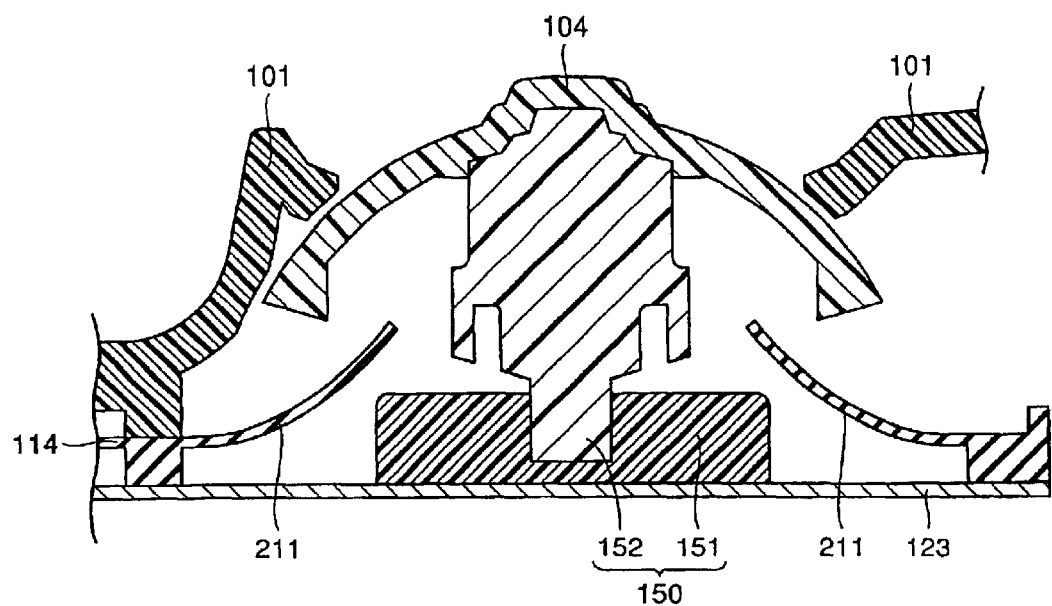
FIG. 8 is a cross-sectional view of a multi-function switch according to a third embodiment of the present invention.

FIG. 8 is a cross-sectional view of a multi-function switch according to a third embodiment of the present invention.

Referring to FIG. 8, a multi-function switch structure according to the third embodiment of the present invention is different from the one shown in the first embodiment in that a rubber film 211 is not in direct contact with pivoting portion 152. In addition, rubber film 211 is different from rubber film 111 shown in the first embodiment in that a portion with play is not present.

Rubber film 211 is continuous to base rubber 114, and is formed to extend upward, that is, to extend away from base plate 123, as distanced from base rubber 114. Rubber film 211 extends underneath operation key 104. In addition, operation key 104 overhangs rubber film 211 to form "eaves". As rubber film 211 is not in contact with pivoting portion 152, rubber film 211 is not adhered to pivoting portion 152. Front case 101 is positioned over rubber film 211 and operation key 104. Front case 101 is formed to cover rubber film 211.

Figure 9:
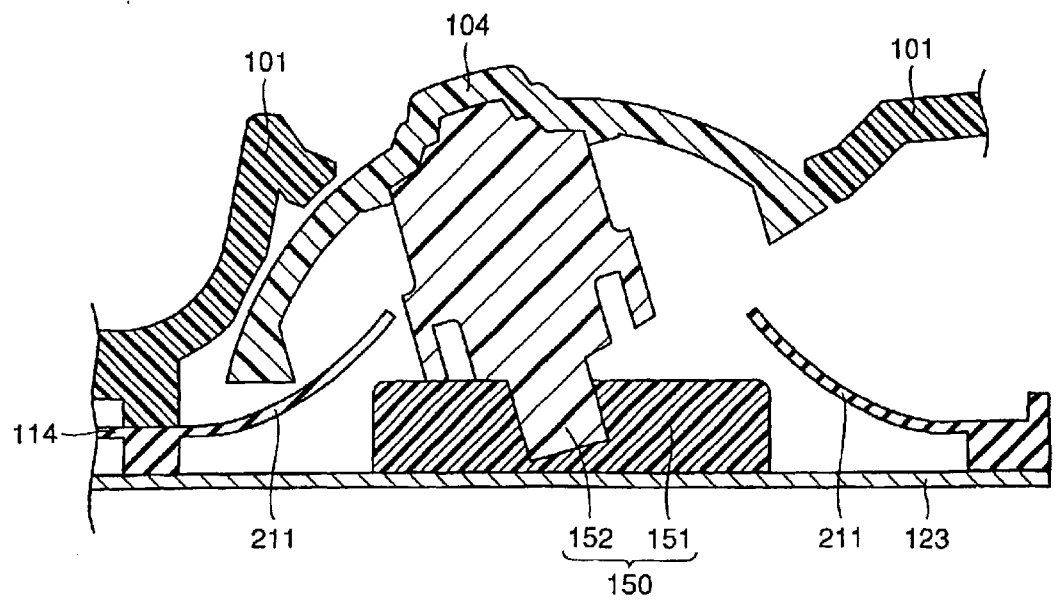
FIG. 9 is a cross-sectional view illustrating an operation of the multi-function switch shown in FIG. 8.
Figure 10:
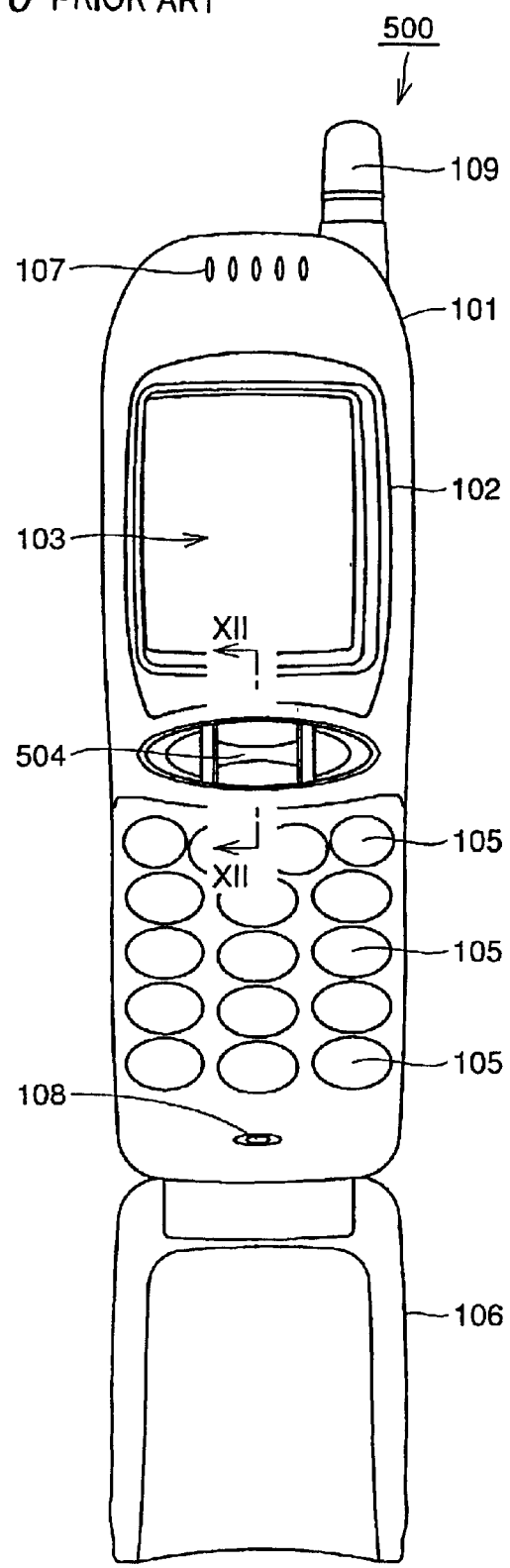
FIG. 10 is a plan view of a conventional portable phone.
Figure 11:
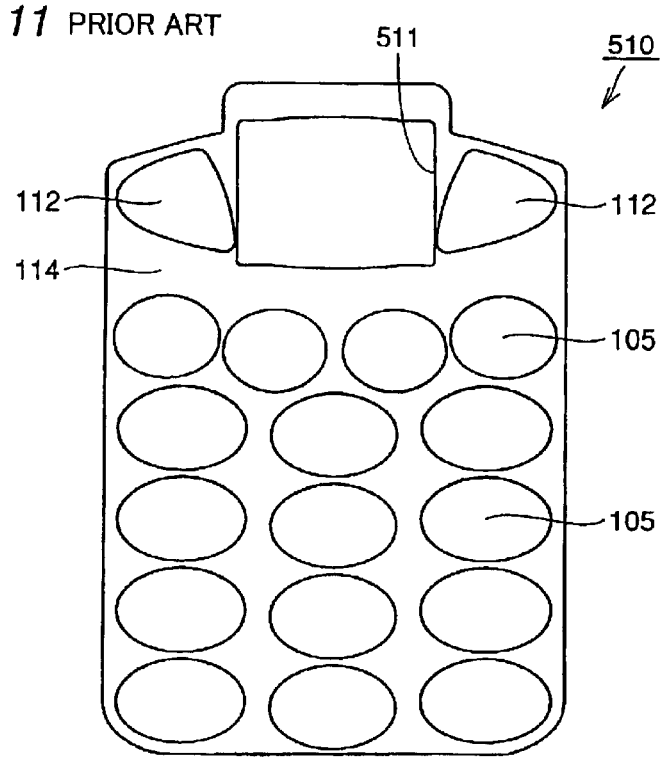
FIG. 11 is a plan view of a keypad of the portable phone shown in FIG. 10.
Figure 12:
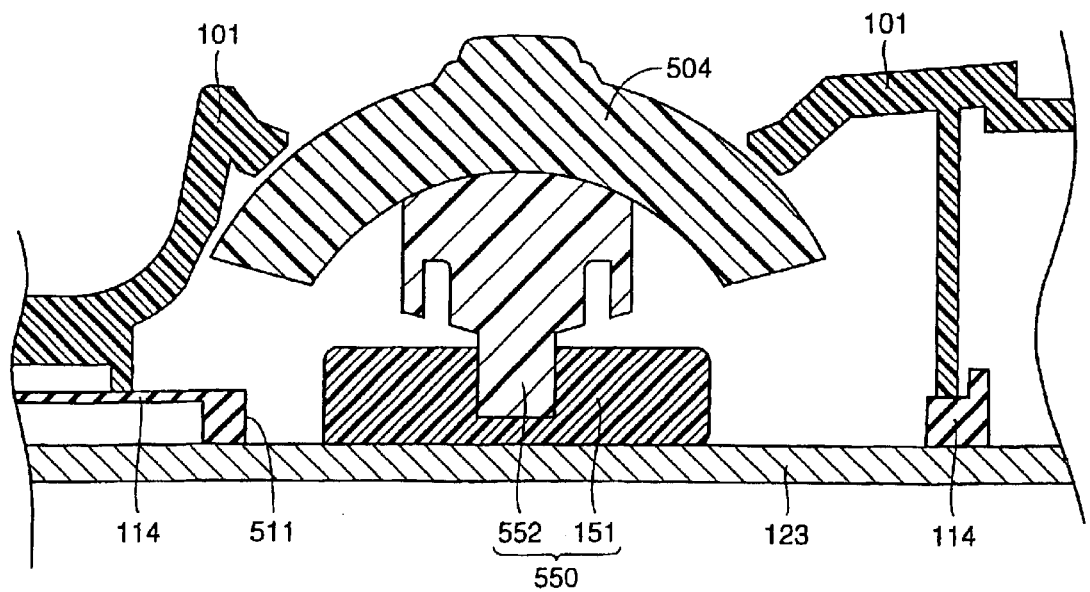
FIG. 12 shows a cross-section viewed along the line XII—XII in FIG. 10.

FIG. 9 is a cross-sectional view illustrating an operation of the multi-function switch structure shown in FIG. 8. As shown in FIG. 9, when operation key 104 pivots to the left in the figure, a left side portion of operation key 104 comes closer to rubber film 211 and a right side portion is distanced from the same. Thus, even when operation key 104 has pivoted to one end, rubber film 211 is arranged to extend underneath operation key 104. Rubber film 211 may be in contact with operation key 104.

A multi-function switch structure thus constructed and a portable terminal using the same will also have the same effect as the first embodiment. Moreover, operability of operation key 104 will be enhanced because the rubber film is not in direct contact with the pivoting portion.

Though embodiments of the present invention have been described in the foregoing, embodiments represented herein can be modified in various ways. First, a multi-function switch shown herein can be used not only in a portable phone but also in other instruments. In addition, even in a case used in a portable phone, configurations shown in the figures are only by way of examples and capable of modifications as necessary.

Although the present invention has been described and illustrated in detail, it is clearly understood that the same is by way of illustration and example only and is not to be taken by way of limitation, the spirit and scope of the present invention being limited only by the terms of the appended claims.

According to the present invention, by covering with a rubber film a multi-function switch structure mounted on a base plate, the multi-function switch structure can be provided with waterproof and dustproof function and excellent operability.

Industrial Applicability

A multi-function switch structure and a portable terminal according to the present invention can be used in a field of a portable phone.

What is claimed is:

1. A multi-function switch structure, comprising:
   a multi-function switch configured to pivot in a prescribed direction, said multi-function switch including a pivoting portion and a fixed portion, wherein said fixed portion is mounted on a base plate and configured to receive therein said pivoting portion; and
   a rubber film provided on the base plate to cover at least a portion of an outer surface of said multi-function switch.

2. The multi-function switch structure according to claim 1, wherein said rubber film is adhered to said multi-function switch and is provided with a portion easing tension of said rubber film caused by pivoting movement of said multi-function switch.

3. The multi-function switch structure of claim 1, wherein said rubber film does not engage said pivoting portion.

4. A multi-function switch structure, comprising:

a multi-function switch configured to pivot in a prescribed direction, said multi-function switch including a pivoting portion and a fixed portion, wherein said fixed portion is mounted on a base plate and configured to receive therein said pivoting portion;

a rubber film provided above a base plate; and an operation key provided on said multi-function switch, wherein said rubber film extends underneath said operation key.

5. The multi-function switch structure according to claim 4, wherein said operation key pivots from one end to the other alone with said multi-function switch, and when said operation key has pivoted to reach one end, said rubber film is arranged to extend underneath said operation key.

6. The multi-function switch structure of claim 4, wherein said rubber film does not engage said pivoting portion.

7. A multi-function switch structure, comprising:

a multi-function switch including a pivoting portion and a fixed portion; and a rubber film provided above a base plate covering at least a portion of an outer surface of said multi-function switch, wherein said fixed portion is mounted on the base plate and includes a recess receiving said pivoting portion.

8. A multi-function switch structure, comprising:

a multi-function switch configured to pivot in a prescribed direction; and a rubber film provided on a base plate to cover at least a portion of an outer surface of said multi-function switch, wherein said rubber film does not engage said multi-function switch.

9. A multi-function switch structure, comprising:

a multi-function switch configured to pivot in a prescribed direction;

a rubber film provided above a base plate; and an operation key provided on said multi-function switch, wherein said rubber film extends underneath said operation key, and said rubber film does not engage said multi-function switch.

* * * * *